United States Patent
Yuan et al.

(10) Patent No.: US 11,598,996 B2
(45) Date of Patent: Mar. 7, 2023

(54) LIGHT-ADJUSTING GLASS AND SMART VEHICLE WINDOW

(71) Applicants: Beijing BOE Optoelectronics Technology Co., Ltd., Beijing (CN); BOE TECHNOLOGY GROUP CO., LTD., Beijing (CN)

(72) Inventors: Hongliang Yuan, Beijing (CN); Xiaojuan Wu, Beijing (CN); Yong Zhang, Beijing (CN); Limin Zhang, Beijing (CN); Zhiqiang Zhao, Beijing (CN); Qi Zheng, Beijing (CN); Yao Bi, Beijing (CN); Xuan Zhong, Beijing (CN); Zhangxiang Cheng, Beijing (CN); Donghua Zhang, Beijing (CN); Jiaxing Wang, Beijing (CN); Ce Wang, Beijing (CN); Jian Wang, Beijing (CN); Yanchen Li, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/280,901

(22) PCT Filed: Dec. 8, 2020

(86) PCT No.: PCT/CN2020/134516
§ 371 (c)(1),
(2) Date: Mar. 28, 2021

(87) PCT Pub. No.: WO2021/115253
PCT Pub. Date: Jun. 17, 2021

(65) Prior Publication Data
US 2022/0100021 A1    Mar. 31, 2022

(30) Foreign Application Priority Data

Dec. 12, 2019 (CN) .......................... 201911271293.6

(51) Int. Cl.
*G02F 1/1343* (2006.01)
*G02F 1/1345* (2006.01)
(Continued)

(52) U.S. Cl.
CPC ............ *G02F 1/13456* (2021.01); *B60J 3/04* (2013.01); *G02F 1/1339* (2013.01);
(Continued)

(58) Field of Classification Search
CPC ............. G02F 1/1333; G02F 1/133345; G02F 1/133354; G02F 1/1343; G02F 1/134309;
(Continued)

(56) References Cited

U.S. PATENT DOCUMENTS 9,904,142 B2    2/2018 Shiota
2008/0272471 A1* 11/2008 Onodera ............... G02F 1/1345
257/668

(Continued)

FOREIGN PATENT DOCUMENTS

CN    103135291 A    6/2013
CN    106104374 A    11/2016
(Continued)

OTHER PUBLICATIONS

European Patent Office, the extended European search report dated Dec. 16, 2022 for corresponding EP application 20864335.3.

*Primary Examiner* — Thoi V Duong
(74) *Attorney, Agent, or Firm* — Houtteman Law LLC

(57) ABSTRACT

The present disclosure provides a light-adjusting glass and a smart vehicle window. The light-adjusting glass has a transmittance adjustment region and an encapsulation region; the
(Continued)

light-adjusting glass includes: a first and second substrates opposite to each other, and a dye liquid crystal layer between the first and second substrates in the transmittance adjustment region, and a frame sealant in the encapsulation region; the first substrate includes a first base and a first electrode layer on a side of the first base proximal to the dye liquid crystal layer; the second substrate includes a second base and a second electrode layer on a side of the second base proximal to the dye liquid crystal layer; a conductive structure is provided in the frame sealant; a first and second voltage transmission structures electrically insulated from each other are on the first base.

19 Claims, 6 Drawing Sheets

(51) Int. Cl.
　　*G02F 1/1333*　　　(2006.01)
　　*G02F 1/1339*　　　(2006.01)
　　*B60J 3/04*　　　　(2006.01)
(52) U.S. Cl.
　　CPC .... *G02F 1/13439* (2013.01); *G02F 1/133345* (2013.01); *G02F 1/133354* (2021.01); *G02F 1/134309* (2013.01); *G02F 2202/04* (2013.01); *G02F 2203/48* (2013.01)
(58) Field of Classification Search
　　CPC .......... G02F 1/13439; G02F 1/134372; G02F 1/1339; G02F 1/1345; G02F 1/13452; G02F 1/13458; G02F 1/13456; G02F 1/13475; G02F 2202/04; G02F 2203/48; B60J 3/04; B60J 1/00
　　See application file for complete search history.

(56) References Cited

U.S. PATENT DOCUMENTS

| | | | |
|---|---|---|---|
| 2017/0285420 A1* | 10/2017 | Okuyama | ......... G02F 1/134336 |
| 2017/0322437 A1 | 11/2017 | Monma et al. | |
| 2019/0041680 A1 | 2/2019 | Yoshida et al. | |

FOREIGN PATENT DOCUMENTS

| | | |
|---|---|---|
| CN | 107703663 A | 2/2018 |
| CN | 209674156 U | 11/2019 |
| CN | 210803935 U | 6/2020 |
| WO | WO2017082403 A1 | 5/2017 |

* cited by examiner

LIGHT-ADJUSTING GLASS AND SMART VEHICLE WINDOW

CROSS REFERENCE TO RELATED APPLICATIONS

The present application claims the priority of the Chinese Patent Application with the Application No. 201911271293.6 filed Dec. 12, 2019, the content of which is incorporated herein by reference in its entirety.

TECHNICAL FIELD

The present disclosure relates to the field of display vehicle window technology, and in particular to a light-adjusting glass and a smart vehicle window.

BACKGROUND

At present, the light-adjusting glass is used more and more extensively in the fields of building and traffic, and existing customers of automobiles, high-speed rails, passenger planes and the like are interested in a dye liquid crystal light-adjusting glass. Products such as Polymer Dispersed Liquid Crystal (PDLC) smart glass, electrochromic smart glass and the like exist in an existing smart glass market. The PDLC smart glass may only realize a switching between transparency and haze, and does not shade light or insulate heat; the electrochromic smart glass has the problems of a complex film forming process, a long response time (8 to 20 s), bluish light in a dark state and the like. The dye liquid crystal light-adjusting glass realizes a switching between a bright state and a dark state by utilizing a selective absorption of dichroic dye molecules in liquid crystals to light, and greatly improves optical properties such as black state purity, response time and the like compared with the existing PDLC smart glass and the electrochromic smart glass.

SUMMARY

The present disclosure provides a light-adjusting glass and a smart vehicle window.

In a first aspect, an embodiment of the present disclosure provides a light-adjusting glass, which has a transmittance adjustment region and an encapsulation region at least partially surrounding the transmittance adjustment region; the light-adjusting glass includes: a first substrate and a second substrate opposite to each other, and a dye liquid crystal layer between the first substrate and the second substrate in the transmittance adjustment region, and a frame sealant in the encapsulation region; wherein the first substrate includes a first base and a first electrode layer on a side of the first base proximal to the dye liquid crystal layer; the second substrate includes a second base and a second electrode layer on a side of the second base proximal to the dye liquid crystal layer; wherein, a conductive structure is in the frame sealant; a first voltage transmission structure and a second voltage transmission structure electrically insulated from each other are on the first base; the first voltage transmission structure is electrically connected to the first electrode layer; and the frame sealant at least covers a part of the second voltage transmission structure, so that the second voltage transmission structure is electrically connected to the second electrode layer through the conductive structure in the frame sealant.

Optionally, the second voltage transmission structure is in a peripheral region of the first electrode layer by at least partially surrounding the first electrode layer.

Optionally, the first electrode layer and the second electrode layer are both plate-shaped electrodes.

Optionally, the first voltage transmission structure and the first electrode layer are formed as a single piece.

Optionally, the first electrode layer includes a plurality of strip-shaped electrodes; the second electrode layer includes a plate-shaped electrode.

Optionally, the first voltage transmission structure includes a plurality of first pads and a plurality of second pads; first ends of the plurality of first pads proximal to the first electrode layer are connected to the plurality of strip-shaped electrodes, respectively; second ends of the plurality of first pads distal to the first electrode layer are electrically connected to first ends of the plurality of second pads proximal to the first electrode layer through a plurality of fan-out traces, respectively.

Optionally, the plurality of second pads are located outside the encapsulation region on the first base.

Optionally, the plurality of first pads and the second plurality of pads are in a same layer and are made of the same material as the second voltage transmission structure.

Optionally, a transition layer is at a second end of each of the plurality of second pads distal to the first electrode layer, and the transition layer is in a same layer and is made of the same material as the strip-shaped electrodes.

Optionally, the second voltage transmission structure includes: a first transmission sub-structure and a second transmission sub-structure; the first transmission sub-structure and the first voltage transmission structure are on a same side of the encapsulation region; and the second transmission sub-structure is on the other sides of the encapsulation region except the side with the first transmission sub-structure, and the first transmission sub-structure is electrically connected to the second transmission sub-structure.

Optionally, the first transmission sub-structure includes a third pad electrically connected to the second transmission sub-structure via a connection trace; the third pad and the plurality of second pads are arranged side by side; and the connection trace and the fan-out traces are arranged side by side.

Optionally, an orthographic projection of the second electrode layer on the first base covers an orthographic projection of the first transmission sub-structure on the first base.

Optionally, the light-adjusting glass further includes an interlayer insulating layer, wherein the interlayer insulating layer covers at least the first electrode layer, and exposes the first transmission sub-structure and the second transmission sub-structure.

In a second aspect, the present disclosure further provides a smart vehicle window including the above light-adjusting glass.

In a third aspect, the present disclosure further provides a method of manufacturing a light-adjusting glass, including: forming a first substrate including: manufacturing a first base and forming a first electrode layer, a first voltage transmission structure and a second voltage transmission structure on the first substrate, wherein the first voltage transmission structure and the second voltage transmission structure are electrically insulated from each other; the first electrode layer is provided in a transmittance adjustment region, and at least a part of the second voltage transmission structure is provided in an encapsulation region at least partially surrounding the transmittance adjustment region; forming a frame sealant in the encapsulation region, so that the frame sealant includes a conductive structure and a first portion which at least partially covers the second voltage transmission structure; forming a second substrate such that the second substrate includes a second base and a second electrode layer formed on the second base; and aligning and assembling the first substrate and the second substrate, so that the frame sealant is arranged between the first substrate and the second substrate and is bonded to the second electrode layer.

Optionally, the method of manufacturing a light-adjusting glass further includes forming an interlayer insulating layer on the first electrode layer to cover the first electrode layer and expose the second voltage transmission structure, before forming the frame sealant in the encapsulation region.

Optionally, forming the first electrode layer and the first voltage transmission structure includes forming the first electrode layer and the first voltage transmission structure as a single piece by a single patterning process with a same material.

Optionally, forming the first electrode layer and the first voltage transmission structure includes forming the first electrode layer including a plurality of strip-shaped electrodes and the first voltage transmission structure including a plurality of first pads and a plurality of second pads, such that first ends of the plurality of first pads proximal to the first electrode layer are connected to the plurality of strip-shaped electrodes, respectively; second ends of the plurality of first pads distal to the first electrode layer are electrically connected to first ends of the plurality of second pads proximal to the first electrode layer through a plurality of fan-out traces, respectively.

Optionally, forming the first and second voltage transmission structures includes forming the plurality of first pads, the plurality of second pads, and the second voltage transmission structure by using a same material and a same patterning process.

Optionally, forming the first and second voltage transmission structures includes forming a transition layer and the plurality of strip-shaped electrodes by using a same material and a same patterning process, wherein the transition layer is disposed at a second end of each of the plurality of second pads distal to the first electrode layer.

DETAIL DESCRIPTION OF EMBODIMENTS

In order to make a person skilled in the art understand the technical solutions of the present disclosure better, the present disclosure is described below in detail with reference to the accompanying drawings and the specific embodiments.

Unless defined otherwise, technical or scientific terms used herein shall have ordinary meanings as understood by a person skilled in the art to which the present disclosure belongs. The use of "first," "second," and the like in the present disclosure is not intended to indicate any order, quantity, or importance, but rather is used to distinguish one element from another. Also, the use of the words "a," "an," or "the" and the like do not indicate a limitation for the number of items, but rather indicate the presence of at least one item. The word "including", "includes", "including" or "includes" and the like means that an element or item preceding the word includes an element or item listed after the word and its equivalent, but does not exclude other elements or items. The word "connected" or "coupled" and the like is not limited to physical or mechanical connections, but may include electrical connections, regardless of direct or indirect. The words "upper", "lower", "left", "right" and the like are used only to indicate relative positional relationships among objects, and when an absolute position of a described object is changed, the relative positional relationships may be changed accordingly.

It should be noted that, in the embodiment of the present disclosure, as described in the specification, a first layer is located on a second layer, which means that the first layer is not macroscopically above the second layer, but that the order for forming the layers is one by one. That is, a later formed film layer is on an earlier formed film layer.

Figure 1:
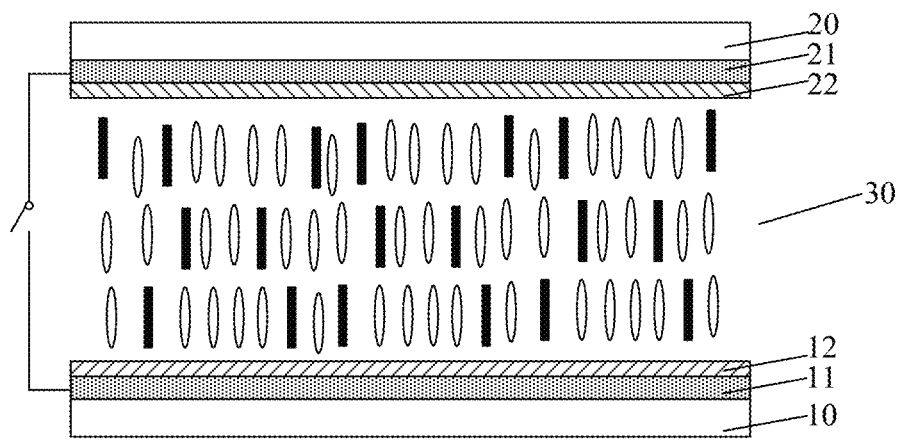
FIG. 1 is a schematic view of a light-adjusting glass in a bright state.
Figure 2:
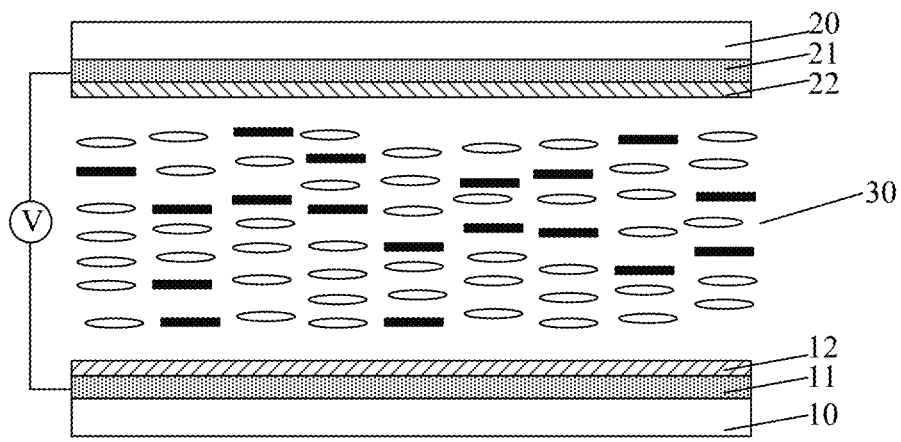
FIG. 2 is a schematic view of a light-adjusting glass in a dark state.

As shown in FIGS. 1 and 2, an exemplary light-adjusting glass is provided, which includes a first substrate, a second substrate and a dye liquid crystal layer 30, wherein the first substrate and the second substrate are oppositely arranged, and the dye liquid crystal layer is arranged between the first substrate and the second substrate; the first substrate includes a first base 10, and a first electrode layer 11 and a first alignment layer 12 which are sequentially arranged on a side of the first base 10 proximal to the liquid crystal layer; the second substrate includes: a second base 20, and a second electrode layer 21 and a second alignment layer 22 which are sequentially arranged on a side of the second base 20 proximal to the liquid crystal layer; a material of the liquid crystal layer 30 includes liquid crystal molecules and dichroic dye molecules. Depending on dichroic properties of the dichroic dye molecules, only light in an incident light that is parallel to a long axis of the dye molecules may be absorbed.

Specifically, in the embodiment of the present disclosure, a case will be described as an example where the first electrode layer 11 and the second electrode layer 21 are both plate electrode layers. The light-adjusting glass is a TN-type liquid crystal cell, that is, a display mode thereof is a normally white mode. When no voltage is applied to the first electrode layer 11 and the second electrode layer 21, the light-adjusting glass is in a bright state, as shown in FIG. 1;

when a voltage is applied to the first electrode layer 11 and the second electrode layer 21, the light-adjusting glass is in a dark state, as shown in FIG. 2.

In the prior art, applying a voltage to the first electrode layer 11 and the second electrode layer 21 of the light-adjusting glass mainly includes two ways of: providing pads in peripheral regions of the first base 10 and the second base 20, exposing the pads, and welding the pads with leads, respectively, so that a size of the light-adjusting glass is inevitably increased by providing the pad regions in the peripheral regions of the first base and the second base; providing pads at a location corresponding to half of the peripheral region of the first base 10, and cutting off the other half of the peripheral region; providing the pads at the positions of the peripheral region of the second base 20 corresponding to the positions where the first base 10 is cut, cutting the other half of the peripheral region, and then welding the pads with leads, respectively. Although a size of the light-adjusting glass may be reduced compared to the first way, the second way needs an additional cutting process. To solve this problem, a light-adjusting glass is provided in the following embodiments of the present disclosure.

Figure 3:
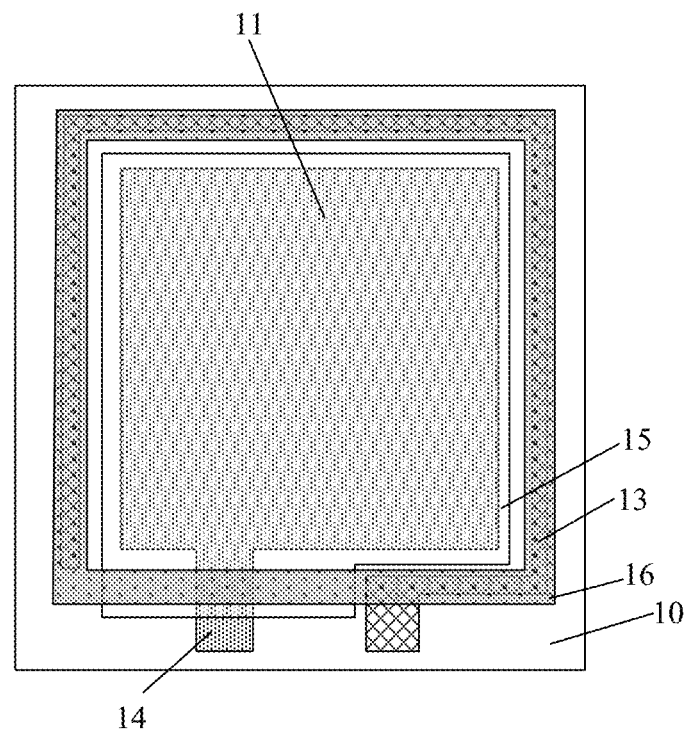
FIG. 3 is a top view of a first substrate of a light-adjusting glass according to an embodiment of the present disclosure.
Figure 11:
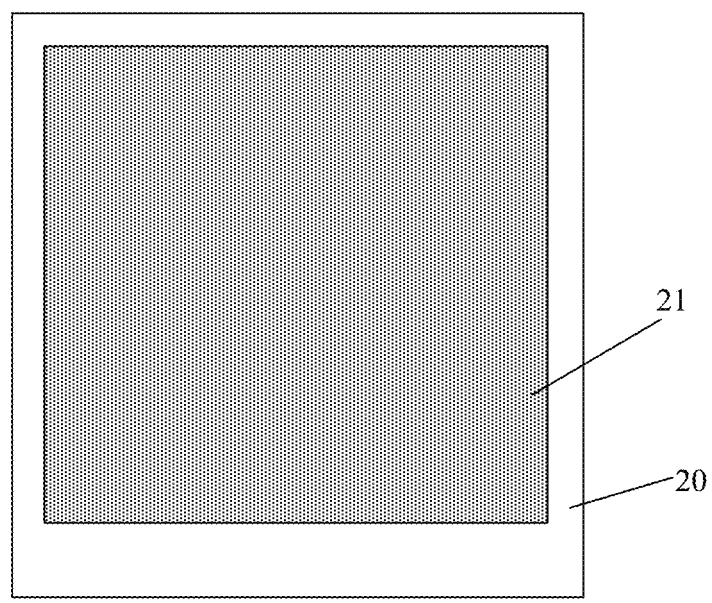
FIG. 11 is a top view of a second substrate of a light-adjusting glass according to an embodiment of the present disclosure.

In a first aspect, as shown in FIGS. 3 and 11, embodiments of the present disclosure provide a light-adjusting glass having an encapsulation region and a transmittance adjustment region defined by the encapsulation region; this light-adjusting glass includes: a first substrate, a second substrate, a dye liquid crystal layer 30 and a frame sealant 16, wherein the first substrate and the second substrate are provided oppositely, the dye liquid crystal layer is provided between the first substrate and the second substrate and is positioned in the transmittance adjustment region, and the frame sealant 16 is positioned in the encapsulation region; wherein, the first substrate includes: a first base 10, the first electrode layer 11 is arranged on a side of the first base 10 proximal to a dye liquid crystal layer; the second substrate includes: a second base 20, and a second electrode layer 21 disposed on a side of the second base 20 proximal to the dye liquid crystal layer. Particularly, a conductive structure is disposed in the frame sealant 16; a first voltage transmission structure 14 and a second voltage transmission structure 13 electrically insulated from each other are further provided on the first base 10; the first voltage transmission structure 14 is connected to the first electrode layer 11; the second voltage transmission structure 13 is electrically connected to the second electrode layer 21 through the conductive structure in the frame sealant 16. In this way, a voltage may be applied to the first electrode layer 11 through the first voltage transmission structure 14, and a voltage may be applied to the second electrode layer 21 through the second voltage transmission structure 13, so that the liquid crystal molecules and the dye molecules in the dye liquid crystal layer sandwiched between the first electrode layer 11 and the second electrode layer 21 are rotated to adjust the transmittance of the light irradiated to the light-adjusting glass. As shown in FIG. 3, the frame sealant 16 at least covers a portion of the second voltage transmission structure so that the conductive structure in the frame sealant 16 serves as a conductive medium between the second voltage transmission structure and the second electrode layer 21, and the second electrode layer 21 is powered by the second voltage transmission structure.

It should be noted that the conductive structure in the frame sealant 16 includes, but is not limited to, a conductive gold ball formed in the frame sealant 16 in a doped manner. Conductive gold balls may be doped at each position of the frame sealant 16, or only the position corresponding to the second voltage transmission structure 13. It should be understood that, in order to prevent the first electrode layer 11 and the second electrode layer 21 from being electrically connected, the frame sealant 16 is disposed in an insulating manner from the first electrode layer 11.

In one example, as shown in FIG. 3, the light-adjusting glass includes: a first substrate, a second substrate, a dye liquid crystal layer and a frame sealant 16, wherein the first substrate and the second substrate are provided oppositely; the dye liquid crystal layer and the frame sealant 16 are provided between the first substrate and the second substrate; wherein the first substrate includes a first base 10, and a second voltage transmission structure 13, a first electrode layer 11 and a first voltage transmission structure 14 in a same layer, and an interlayer insulating layer 15 sequentially arranged on a side of the first base 10 distal to the dye liquid crystal layer. The second substrate includes a second base 20, and a second electrode layer 21 disposed on a side of the second base 20 proximal to the dye liquid crystal layer. The first electrode layer 11 and the second electrode layer 21 each include a plate-shaped electrode. The frame sealant 16 is disposed in the encapsulation region, specifically, may be disposed on the first base 10, or may be disposed on the second base 20. In this embodiment, the frame sealant 16 is disposed on the first base 10, the second voltage transmission structure 13 at least contacts with a position where a conductive structure is provided in the frame sealant 16.

In some embodiments, the first voltage transmission structure 14 and the first electrode layer 11 are formed as a single piece. That is, as shown in FIG. 1, the first voltage transmission structure 14 and the first electrode layer 11 are integrally formed as a single piece, so that the first voltage transmission structure 14 and the first electrode layer 11 may be formed by a single patterning process. A material of the first electrode layer 11 includes, but is not limited to, Indium Tin Oxide (ITO).

Figure 4:
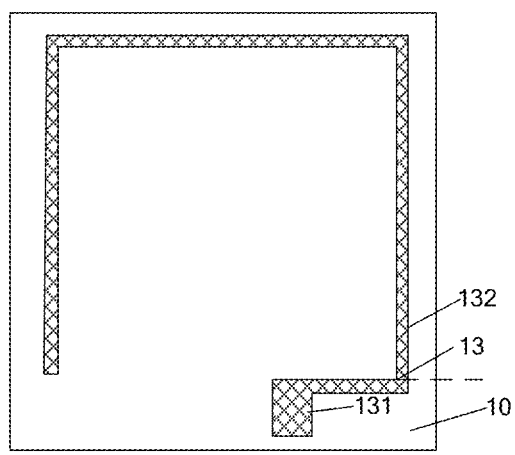
FIG. 4 is a top view of a second voltage transmission structure on the first substrate shown in FIG. 3.
Figure 5:
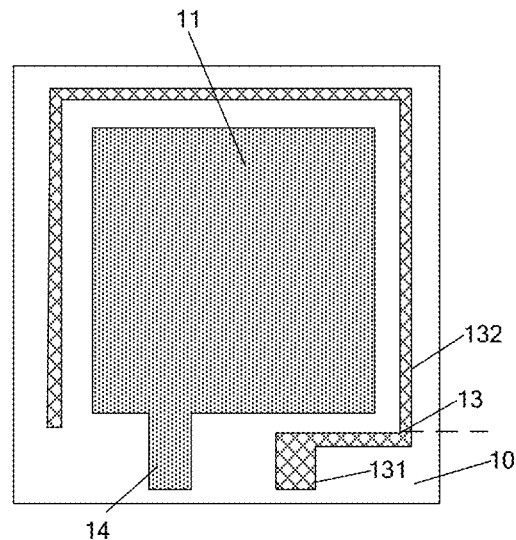
FIG. 5 is a top view of a first electrode layer and a first voltage transmission structure on the first substrate shown in FIG. 3.

In order to enhance the conductivity of the second voltage transmission structure 13, the second voltage transmission structure 13 may be made of a metal conductive material, such as copper (Cu). In some embodiments, since the second electrode layer 21 is a plate-shaped electrode, in order to ensure that the voltage applied on the second electrode layer 21 is uniform, at this time, the second voltage transmission structure 13 may be designed as a structure composed of a first transmission sub-structure 131 and a second transmission sub-structure 132, as shown in FIG. 4; wherein, the first transmission sub-structure 131 and the first voltage transmission structure 14 are located at the same side of the encapsulation region, as shown in FIG. 5; the second transmission sub-structure 132 is located at the other sides of the encapsulation region except the side where the first transmission sub-structure 131 is located, that is, the second transmission sub-structure 132 is a U-shaped structure shown in FIG. 4, and the first transmission sub-structure 131 is electrically connected to the second transmission sub-structure 132. The interlayer insulating layer 15 is hollowed at the positions where the first transmission sub-structure and the second transmission sub-structure are located, the first transmission sub-structure and the second transmission sub-structure are exposed, and the frame sealant 16 is provided in the encapsulation region and covers the first transmission sub-structure and the second transmission sub-structure. Thus, after aligning and assembling the second substrate and the first substrate, the second electrode layer 21 may be electrically connected to the first transmission sub-structure and the second transmission sub-structure through the conductive structure in the frame sealant 16.

For the above light-adjusting glass, the embodiment of the present disclosure provides a method for manufacturing the light-adjusting glass. For convenience of description, a case will be described as an example where the light-adjusting glass is a rectangular glass, and in this case, the encapsulation region is a rectangular closed loop structure having a first side and a second side which are oppositely disposed (opposite to each other in the left-right direction in FIG. 3), and a third side and a fourth side which are oppositely disposed (opposite to each other in the up-down direction in FIG. 3). The method includes steps of forming a first substrate, a second substrate, and a dye liquid crystal layer filled between the first substrate and the second substrate.

The step of forming the first substrate includes the following steps:

Step 1, as shown in FIG. 4, the second voltage transmission structure 13 is formed on the first base 10 through a patterning process; wherein, the second voltage transmission structure 13 includes the first transmission sub-structure and the second transmission sub-structure; the first transmission sub-structure is positioned on the fourth side of the encapsulation region, and the second transmission sub-structure is a U-shaped structure and is positioned on the first side, the second side and the third side of the encapsulation region; an end of the first transmission sub-structure is a block-shaped structure, and the other end of the first transmission sub-structure and the second transmission sub-structure are formed as single piece. The first transmission sub-structure except the position of the block-shaped structure and the second transmission sub-structure are strip-shaped with a width of about 2 mm; the block-shaped structure of the first transmission sub-structure is used for being welded with an external lead, and a size of the block-shaped structure may be set according to a size of the light-adjusting glass.

Step 2, as shown in FIG. 5, a pattern including the first electrode layer 11 and the first voltage transmission structure 14 is formed through a single patterning process. The first electrode layer 11 is located in the transmittance adjustment region; the first voltage transmission structure 14 is a block-shaped structure, integrated with the first electrode layer 11, and extends from the transmittance adjustment region to a side of the fourth side of the encapsulation region distal to the transmittance adjustment region. The materials of the first electrode layer 11 and the first voltage transmission structure 14 include, but are not limited to, ITO; a width of the first voltage transmission structure 14 is around 15 mm.

Figure 6A:
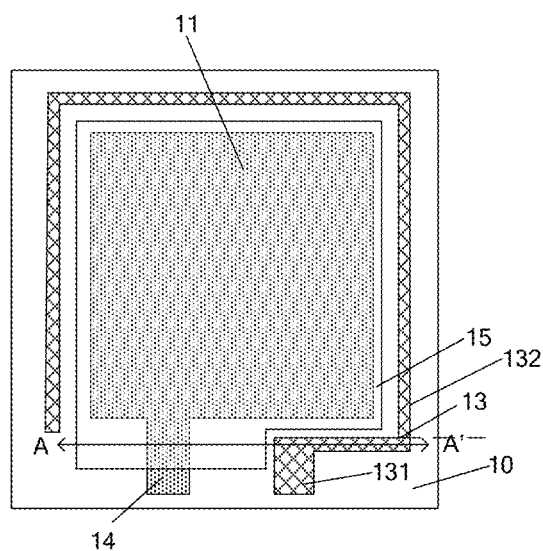
FIGS. 6A and 6B are a plan view and a cross-sectional view of an interlayer insulating layer on the first substrate shown in FIG. 3, respectively.
Figure 6B:
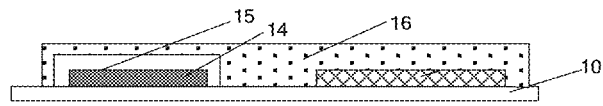

Step 3, as shown in FIGS. 6A and 6B, an interlayer insulating layer 15 is formed over the layer where the first electrode layer 11 and the first voltage transmission structure 14 are located, wherein the interlayer insulating layer 15 covers the first electrode layer 11 and the first voltage transmission structure 14, and exposes the second voltage transmission structure 13. As shown in the cross-sectional view taken along a line AA' of FIG. 6A and shown in FIG. 6B, the interlayer insulating layer 15 exposes the first transmission sub-structure 131. A certain distance, of about 200 µm, exists between an edge of the interlayer insulating layer 15 and the encapsulation region, and is mainly used for insulating the first voltage transmission structure 14 from the frame sealant formed thereon for bonding to the second substrate. Therefore, the first voltage transmission structure 14 must be insulated before the frame sealant 16 for bonding to the second substrate is formed.

Step 4, as shown in FIG. 3, the frame sealant 16 is formed in the encapsulation region, wherein the frame sealant 16 is doped with conductive gold balls, a width of the frame sealant 16 may be determined according to the size of the light-adjusting glass. For a 5 inch light-adjusting glass, the width of the frame sealant 16 is between 2 nm and 2.6 mm. For a larger size light-adjusting glass, the width of the frame sealant 16 may be designed to be between 3 mm and 5 mm in consideration of a puncturing risk of the frame sealant 16.

Thus, the first substrate has been manufactured.

The step of forming the second substrate includes the following steps:

Step 1, as shown in FIG. 11, a pattern including the second electrode layer 21 is formed on the second base 20 through a patterning process; the second electrode layer 21 is sized to cover the transmittance adjustment region and the encapsulation region (corresponding to the region where the frame sealant 16 is located) when the second electrode layer 21 is assembled with the first substrate to form the light-adjusting glass, and at least a portion of the block-shaped structures of the first voltage transmission structures 14 and the second voltage transmission structures 13 is exposed by an orthographic projection of the second electrode layer 21 on the first base 10, so as to solder the leads onto the block-shaped structures of the first voltage transmission structures 14 and the second voltage transmission structures 13, so as to apply an external voltage to the first electrode layer 11 and the second electrode layer 21. The material of the second electrode layer 21 includes, but is not limited to, ITO.

It should be noted that, before forming the second electrode layer 21, an insulating layer may be formed on the second base 20 to prevent the second base 20 from being damaged when the second electrode layer 21 is etched. The frame sealant 16 may also be formed on the second substrate, as long as the frame sealant 16 bonds the first and second substrates together. Thus, the second substrate has been manufactured.

Figure 7:
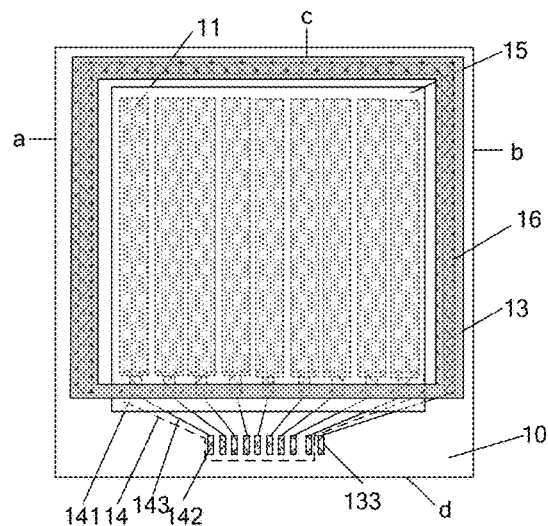
FIG. 7 is a top view of a first substrate of a light-adjusting glass according to an embodiment of the present disclosure.

In one embodiment, as shown in FIG. 7, the structure of the light-adjusting glass is similar to that of the light-adjusting glass described above, except that the first electrode layer 11 includes a plurality of strip-shaped electrodes. In this way, different voltages are applied to the strip-shaped electrodes, such that rotation angles of liquid crystal molecules in the dye liquid crystal layer corresponding to different positions of the light-adjusting glass are different, thereby implementing a louver function. Since the first electrode layer 11 includes a plurality of strip-shaped electrodes, at this time, the first voltage transmission structure 14 includes a plurality of first pads 141 and a plurality of second pads 142 that are disposed in one-to-one correspondence with the plurality of strip-shaped electrodes; the plurality of first pads 141 may be arranged side by side, a first end of each first pad 141 is connected to the corresponding strip-shaped electrode, a second end of each first pad 141 is connected to a first end of the corresponding second pad 142 through a fan-out trace 143 located in a fan-out region, and a second end of each second pad 142 is used for bonding to a chip IC to provide a voltage to the strip-shaped electrode. The second voltage transmission structure 13 may adopt the same structure as described above. Of course, the first transmission sub-structure of the second voltage transmission structure 13 may also adopt a third pad 133 disposed side by side with the second pads 142, where the third pad 133 is connected with the second transmission sub-structure through the fan-out trace 143.

In some embodiments, the first voltage transmission structure 14 and the second voltage transmission structure 13 are disposed in a same layer and have the same material. That is, the first pads 141 and the second pads 142 in the first voltage transmission structure 14 and the first transmission sub-structure and the second transmission sub-structure in the second voltage transmission structure 13 are manufactured by a single patterning process, and the material includes, but is not limited to, a conductive metal.

Figure 12:
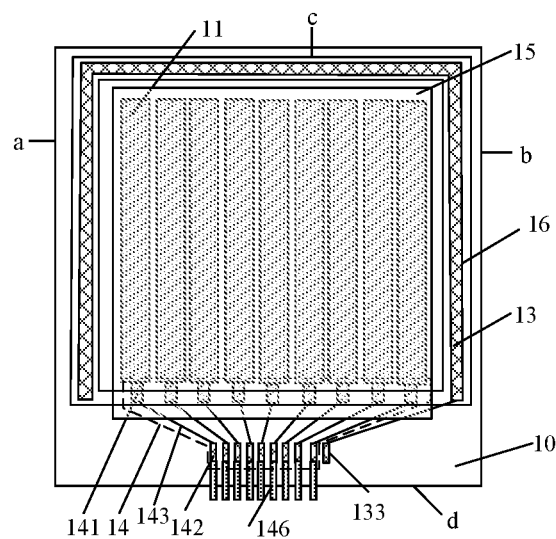
FIG. 12 is a top view of a first substrate of a light-adjusting glass according to an embodiment of the present disclosure.

In some embodiments, a transition layer 146 may also be disposed on the second ends of the second pads 142 for better bonding of the second pads 142 with the chip IC. The material of the transition layer 146 includes, but is not limited to, ITO. For example, the transition layer 146 may be disposed in a same layer as the strip-shaped electrodes, that is, manufactured by a single patterning process, as shown in FIG. 12.

For the above light-adjusting glass, the embodiment of the present disclosure provides a method for manufacturing the light-adjusting glass. For convenience of description, a case will be described as an example where the light-adjusting glass is a rectangular glass, and in this case, the encapsulation region is a rectangular closed loop structure having a first side a and a second side b which are oppositely disposed (opposite to each other in the left-right direction in FIG. 7), and a third side c and a fourth side d which are oppositely disposed (opposite to each other in the up-down direction in FIG. 7). The method includes steps of forming a first substrate, a second substrate, and a dye liquid crystal layer filled between the first substrate and the second substrate. Here, the formation of the second substrate and the dye liquid crystal layer is the same as the above steps and will not be described again.

Figure 8:
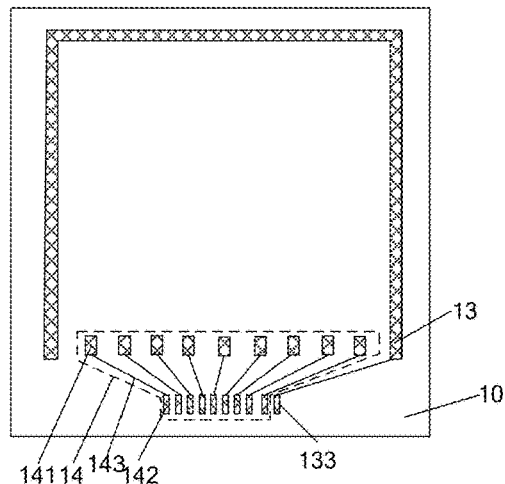
FIG. 8 is a top view of first and second voltage transmission structures on the first substrate shown in FIG. 7.

The step of forming the first substrate includes the following steps:

Step 1, as shown in FIG. 8, the first voltage transmission structure 14 and the second voltage transmission structure 13 are formed on the first base 10 through a patterning process; wherein the first voltage transmission structure 14 includes the plurality of first pads 141 arranged side by side and the plurality of second pads 142 arranged side by side; the plurality of first pads 141 and the plurality of second pads 142 are disposed in a one-to-one correspondence, and a second end of each first pad 141 is connected to a first end of the corresponding second pad 142 through the fan-out trace 143; the second voltage transmission structure 13 includes the first transmission sub-structure (e.g., the third pad 133) and the second transmission sub-structure; the first transmission sub-structure is positioned at the fourth side d of the encapsulation region, and the second transmission sub-structure is a U-shaped structure and is positioned at the first side a, the second side b and the third side c of the encapsulation region; the first transmission sub-structure includes the third pad 133 arranged side by side with the second pads, and a first end of the third pad 133 is connected to the second transmission sub-structure through the fan-out trace 143.

Figure 9:
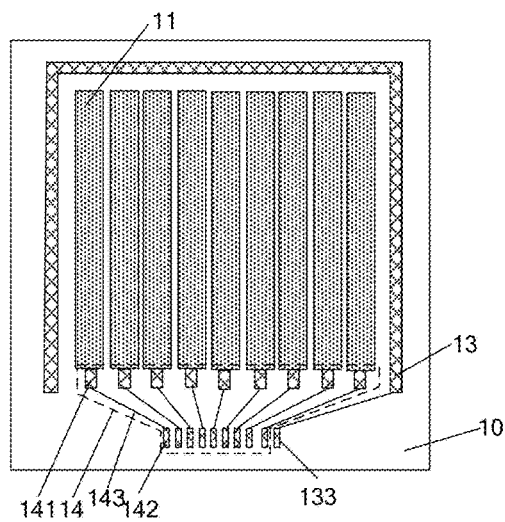
FIG. 9 is a top view of a first electrode layer on the first substrate shown in FIG. 7.

Step 2, as shown in FIG. 9, the first electrode layer 11 is formed in the transmittance adjustment region through a patterning process, wherein the first electrode layer 11 includes a plurality of strip-shaped electrodes; the plurality of strip-shaped electrodes are disposed in one-to-one correspondence with the plurality of first pads 141, and each strip-shaped electrode is connected to a first end of the first pad 141. Wherein, the materials of the first electrode layer 11 and the first voltage transmission structure 14 include, but are not limited to, ITO; a width of the first voltage transmission structure 14 (i.e., a size of the plurality of first pads 141 and the plurality of second pads 142 in a direction perpendicular to an extending direction of the strip-shaped electrodes) is about 15 mm. Further, a transition layer is formed at the second ends of the second pads 142 while the strip-shaped electrodes are formed in this step, and a size of the transition layer is about 800 µm×500 µm.

Figure 10:
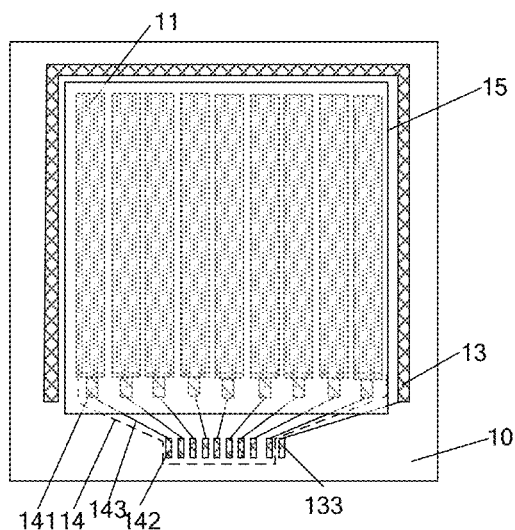
FIG. 10 is a top view of an interlayer insulating layer on the first substrate shown in FIG. 7.

Step 3, as shown in FIG. 10, the interlayer insulating layer 15 is formed above the layer where the first electrode layer 11 is located, wherein the interlayer insulating layer 15 covers the first electrode layer 11 and a portion of the first voltage transmission structure 14. In the embodiment shown in FIG. 10, the interlayer insulating layer 15 covers the plurality of first pads 141 arranged side by side in the first voltage transmission structure 14, exposes the plurality of second pads 142 arranged side by side, and exposes the second voltage transmission structure 13. A certain distance, of about 200 exists between the edge of the interlayer insulating layer 15 and the encapsulation region.

Step 4, as shown in FIG. 7, the frame sealant 16 is formed in the encapsulation region, wherein the frame sealant 16 is doped with conductive gold balls. The frame sealant 16 completely covers the first transmission sub-structure of the second voltage transmission structure 13 at the first side a, the second side b and the third side c; and covers the plurality of first pads 141 arranged side by side in the first voltage transmission structure 14, which is covered by the interlayer insulating layer 15 at the fourth side d; but exposes the second transmission sub-structure (i.e., the third pad 133). The exposed plurality of second pads 142 and the third pad 133 are used for an external power supply.

Thus, the first substrate has been completed.

In a second aspect, the present disclosure provides a smart vehicle window, which includes the above light-adjusting glass.

The smart vehicle window may be applied to an airplane, a building, and the like.

It should be understood that the above embodiments are merely exemplary embodiments employed to illustrate the principles of the present disclosure, but the present disclosure is not limited thereto. It will be apparent to a person skilled in the art that various changes and modifications may be made therein without departing from the spirit and scope of the present disclosure, and these changes and modifications are to be considered within the scope of the present disclosure.

What is claimed is:

1. A light-adjusting glass, which has a transmittance adjustment region and an encapsulation region at least partially surrounding the transmittance adjustment region; the light-adjusting glass comprises: a first substrate and a second substrate opposite to each other, and a dye liquid crystal layer between the first substrate and the second substrate in the transmittance adjustment region, and a frame sealant in the encapsulation region; wherein the first substrate comprises a first base and a first electrode layer on a side of the first base proximal to the dye liquid crystal layer; the second substrate comprises a second base and a second electrode layer on a side of the second base proximal to the dye liquid crystal layer; wherein, a conductive structure is provided in the frame sealant;
    a first voltage transmission structure and a second voltage transmission structure electrically insulated from each other are on the first base;
    the first voltage transmission structure is electrically connected to the first electrode layer; and
    the frame sealant at least covers a part of the second voltage transmission structure, so that the second voltage transmission structure is electrically connected to the second electrode layer through the conductive structure in the frame sealant, wherein the second voltage transmission structure comprises: a first transmission sub-structure and a second transmission sub-structure;

the first transmission sub-structure and the first voltage transmission structure are on a same side of the encapsulation region;

the second transmission sub-structure is a U-shaped structure and is positioned on a first side, a second side and a third side of the encapsulation region; the first transmission sub-structure is positioned on a fourth side of the encapsulation region; and one end of the first transmission sub-structure is a block-shaped structure, and the other end of the first transmission sub-structure and one end of the second transmission sub-structure at the third side are connected to be formed as single piece; and the other end of the second transmission sub-structure is terminated at the first side and is not bent towards the fourth side.

2. The light-adjusting glass of claim 1, wherein the second voltage transmission structure is in a peripheral region of the first electrode layer by at least partially surrounding the first electrode layer.

3. The light-adjusting glass of claim 1, wherein the first electrode layer and the second electrode layer both comprise plate-shaped electrodes.

4. The light-adjusting glass of claim 3, wherein the first voltage transmission structure and the first electrode layer are formed as a single piece.

5. The light-adjusting glass of claim 1, wherein the first electrode layer comprises a plurality of strip-shaped electrodes; and the second electrode layer comprises a plate-shaped electrode.

6. The light-adjusting glass of claim 5, wherein the first voltage transmission structure comprises a plurality of first pads and a plurality of second pads;

first ends of the plurality of first pads proximal to the first electrode layer are coupled to the plurality of strip-shaped electrodes, respectively;

second ends of the plurality of first pads distal to the first electrode layer are electrically coupled to first ends of the plurality of second pads proximal to the first electrode layer through a plurality of fan-out traces, respectively.

7. The light-adjusting glass of claim 6, wherein the plurality of second pads are provided on the first base outside the encapsulation region.

8. The light-adjusting glass of claim 6, wherein the plurality of first pads and the second plurality of pads are in a same layer and are made of a same material as the second voltage transmission structure.

9. The light-adjusting glass of claim 6, further comprising a transition layer which is provided at a second end of each of the plurality of second pads distal to the first electrode layer, and the transition layer is in a same layer and is made of a same material as the strip-shaped electrodes.

10. The light-adjusting glass of claim 9, wherein an orthographic projection of the second electrode layer on the first base covers an orthographic projection of the first transmission sub-structure on the first base.

11. The light-adjusting glass of claim 6, wherein the first transmission sub-structure comprises a third pad electrically connected to the second transmission sub-structure via a connection trace;

the third pad and the plurality of second pads are arranged side by side; and the connection trace and the fan-out traces are arranged side by side.

12. The light-adjusting glass of claim 1, further comprising an interlayer insulating layer, wherein the interlayer insulating layer covers at least the first electrode layer, and exposes the first transmission sub-structure and the second transmission sub-structure.

13. A smart vehicle window, comprising the light-adjusting glass of claim 1.

14. A method for manufacturing a light-adjusting glass, comprising:

forming a first substrate, comprising: preparing a first base and forming a first electrode layer, a first voltage transmission structure and a second voltage transmission structure on the first substrate, wherein the first voltage transmission structure and the second voltage transmission structure are electrically insulated from each other; the first electrode layer is provided in a transmittance adjustment region, and at least a part of the second voltage transmission structure is provided in an encapsulation region at least partially surrounding the transmittance adjustment region;

forming a frame sealant in the encapsulation region such that the frame sealant comprises a conductive structure and a first portion which at least partially covers the second voltage transmission structure;

forming a second substrate such that the second substrate comprises a second base and a second electrode layer formed on the second base; and aligning and assembling the first substrate and the second substrate such that the frame sealant is arranged between the first substrate and the second substrate and is bonded to the second electrode layer, wherein the second voltage transmission structure comprises: a first transmission sub-structure and a second transmission sub-structure;

the first transmission sub-structure and the first voltage transmission structure are on a same side of the encapsulation region; and the second transmission sub-structure is a U-shaped structure and is positioned on a first side, a second side and a third side of the encapsulation region; the first transmission sub-structure is positioned on a fourth side of the encapsulation region; and one end of the first transmission sub-structure is a block-shaped structure, and the other end of the first transmission sub-structure and one end of the second transmission sub-structure at the third side are connected to be formed as single piece; and the other end of the second transmission sub-structure is terminated at the first side and is not bent towards the fourth side.

15. The method for manufacturing a light-adjusting glass of claim 14, further comprising forming an interlayer insulating layer on the first electrode layer to cover the first electrode layer and expose the second voltage transmission structure, before forming the frame sealant in the encapsulation region.

16. The method for manufacturing a light-adjusting glass of claim 14, wherein forming the first electrode layer and the first voltage transmission structure comprises forming the first electrode layer and the first voltage transmission structure as a single piece by a single patterning process with a same material.

17. The method for manufacturing a light-adjusting glass of claim 14, wherein forming the first electrode layer and the first voltage transmission structure comprises forming the first electrode layer comprising a plurality of strip-shaped electrodes and the first voltage transmission structure comprising a plurality of first pads and a plurality of second pads, such that first ends of the plurality of first pads proximal to the first electrode layer are connected to the plurality of strip-shaped electrodes, respectively; second ends of the plurality of first pads distal to the first electrode layer are electrically connected to first ends of the plurality of second pads proximal to the first electrode layer through a plurality of fan-out traces, respectively.

18. The method for manufacturing a light-adjusting glass of claim 17, wherein forming the first and second voltage transmission structures comprises forming the plurality of first pads, the plurality of second pads, and the second voltage transmission structure by a single patterning process with a same material.

19. The method for manufacturing a light-adjusting glass of claim 17, wherein forming the first and second voltage transmission structures comprises forming a transition layer and the plurality of strip-shaped electrodes by a single patterning process with a same material such that the transition layer is disposed at a second end of each of the plurality of second pads distal to the first electrode layer.

* * * * *